United States Patent [19]

Prineppi

[11] Patent Number: 5,954,418
[45] Date of Patent: Sep. 21, 1999

[54] SYNCHRONOUS MOTOR WITH SOLID ROTOR AXIALLY DISPLACED RELATIVE TO COIL

[76] Inventor: Frank Joseph Prineppi, 1108 Avocado Isle, Ft. Lauderdale, Fla. 33315

[21] Appl. No.: 08/681,851

[22] Filed: Jul. 29, 1996

Related U.S. Application Data

[63] Continuation of application No. 08/503,248, Jul. 17, 1995.

[51] Int. Cl.⁶ .................................................. H02H 37/00
[52] U.S. Cl. .......................................... 362/152; 310/257
[58] Field of Search ...................................... 310/162, 164, 310/194, 254, 268, 261, 257, 266; 362/152

[56] References Cited

U.S. PATENT DOCUMENTS

| | | | |
|---|---|---|---|
| 3,028,512 | 4/1962 | Sorchy | 310/77 |
| 3,103,393 | 9/1963 | Kohlhagen | 308/121 |
| 3,131,323 | 4/1964 | Roters et al. | 310/162 |
| 3,427,485 | 2/1969 | Dotto | 310/257 |
| 3,448,306 | 6/1969 | Murray | 310/257 |
| 4,714,853 | 12/1987 | Palmero et al. | 310/257 |
| 4,942,325 | 7/1990 | Fukaya | 310/257 |
| 4,980,608 | 12/1990 | Morrison | 315/185 R |
| 5,260,616 | 11/1993 | Mizutani et al. | 310/49 R |
| 5,283,487 | 2/1994 | Oki et al. | 310/49 R |
| 5,291,084 | 3/1994 | Shiotsuki et al. | 310/49 R |
| 5,568,970 | 10/1996 | Prineppi | 362/407 |
| 5,598,046 | 1/1997 | Miyazawa et al. | 310/49 R |

*Primary Examiner*—Steven L. Stephan
*Assistant Examiner*—Michael J. Wallace, Jr.
*Attorney, Agent, or Firm*—Frohwitter

[57] ABSTRACT

The invention provides in a first aspect a novel synchronous motor in which the rotor comprises a substantially solid multi-pole magnet axially displaced from the coil which, itself, is of substantially the same diametrical size. With this arrangement a very powerful motor can be provided for a relatively small size and is suitable for use in powering ornaments such as Christmas tree ornaments direct from a socket of a fairy light string or decorative lights. In a second aspect of the invention, reciprocation means are provided suitable for use with the synchronous motor of the first aspect which can automatically raise and lower ornaments and similar novelty items. In a third aspect of the invention reciprocation means is provided which may be used either with the synchronous motor of the invention or with a conventional D.C. motor to provide for winding and sudden unwinding of a cord and hence an ornament or a novelty item attached thereto.

2 Claims, 7 Drawing Sheets

SYNCHRONOUS MOTOR WITH SOLID ROTOR AXIALLY DISPLACED RELATIVE TO COIL

This application is a continuation application of application Ser. No. 08/503,248, filed on Jul. 17, 1995, still pending.

This invention relates to apparatus for moving an ornament such as an ornament for a Christmas tree or a practical joke novelty item where movement is necessary to achieve a desired effect, and for means for driving such ornament.

Drive means for such ornaments necessarily have to be small and compact, particularly where the ornament has to hang from something, such as a branch of a Christmas tree.

BACKGROUND OF THE INVENTION

There has been proposed in U.S. Pat. No. 4,980,608, an electric motor rotator for Christmas tree ornaments which includes a small-size synchronous electric motor which is adapted to plug into a lamp socket of a string-set of series connective decorative incandescent lamps so as to utilize the output of the motor to rotate ornaments and light devices.

The motor includes a cup-shaped rotor having an annular magnetic medium deposited on the inner wall of the cup on either side of which inner and outer stators are disposed which interact electrically with a small AC excited coil to cause the rotor to rotate at the synchronous frequency. Even though such a design of motor would, once started, run in one direction or the other this is no particular problem because it is a simple matter to include a so-called "no-back" device to cause the motor to run in a predetermined direction each time it is energised as is shown, for example, in FIG. 5 of U.S. Pat. No. 4,980,608.

The disadvantage of the motor rotator disclosed in U.S. Pat. No. 4,980,608 is that it is of very low power which limits the range of movement which can be achieved utilising the device. This is because the coil is relatively small and magnetic medium is deposited on the inner wall of a cup-shaped rotor such that rotor density is low. Another disadvantage is that a lightweight rotor is, by definition, not particularly rugged and there is the possibility that damage may occur to the motor in the event that the novelty item were to fall.

It is an object of the invention to provide an apparatus for moving an object which alleviates this disadvantage.

The present invention is derived from the surprising realisation that if a large, solid magnetic rotor is provided which is cooperable with electrically energised and relatively long stators then a correspondingly large coil may be used even if it is axially displaced relative to the rotor and, with such construction, the combination provides greatly increased power relative to the motor described in U.S. Pat. No. 4,980,608 for the same diametric size.

SUMMARY OF THE INVENTION

According to the invention in its first aspect there is provided a synchronous motor comprising a coil; a rotor mounted co-axially with, but displaced relative to the coil, the rotor comprising a substantially solid, cylindrical magnet means; and stator means electrically associated with the coil and disposed about the radial periphery of said rotor for interfacing electrically with the rotor to produce rotational movement.

With the motor of the invention, the rotor comprises a substantially solid cylindrical magnet, thus allowing a substantially larger magnetic reaction force to be generated, so increasing the potential power to the weight/size ratio of the motor. As well, the coil may be of the same diameter as the rotor so that the combination of coil and rotor result in a motor of high power which may be used to move relative heavy novelty items which would not be possible with the prior art motor.

Preferably, the stator means comprises first and second stators operatively associated with the opposed axial ends of the coil, one stator means being electrically connected to a casing of the motor containing the coil and extending from one end of the coil towards the rotor, with the second stator means being disposed at the opposed end of the coil and interposed between the limbs of the first stator.

The electric motor is preferably used in an application as an ornament or other novelty item mover in which the features of small size combined with relatively high power are desirable. In this context the term "ornament" used herein is intended to be broadly interpreted to include, for example, replica spiders and other such novelty items where the main purpose of the motor is to provide a desired effect in terms of movement of the ornament.

In accordance with a second aspect of the invention, there is provided an ornament mover comprising an ornament movement reciprocation means including a synchronous motor connected to a pulley mechanism having reaction means for stalling the motor at a point in the path of reciprocation.

This aspect of the invention provides a means for reciprocating movement of an ornament, up or down for example, in a very simple construction. Specifically, as synchronous motors have no preferred direction of rotation, they can be incorporated very efficiently into a reciprocating design by providing a pulley mechanism having reaction means for stalling the motor at one point in the path of reciprocating travel of the ornament. Since the motor can no longer rotate in its existing direction due to the action of the reaction member, it will reverse rotation thus changing the direction of the pulley mechanism until the reaction means is engaged again to change the direction a further time and so on.

Preferably, the pulley mechanism includes gearing means powered by the motor to wind a cord to which the ornament is connected onto a pulley drum, to a retracted position in which the reaction member abuts against the casing of the apparatus causing the synchronous motor to stall, the reaction forces between rotor and stator then causing the motor to reverse direction, thus unwinding the cord from the drum. In the extended position when the cord is unwound from the drum, the cord will simply wind up the other way on the drum to the retracted position.

The ornament mover is preferably used together with the electric motor of the first aspect of the invention.

In accordance with a third aspect of the invention there is provided an ornament or other novelty item mover suitable for use with the synchronous motor of the present invention, if a "no-back" mechanism is incorporated, or with a conventional DC motor if not.

According to the third aspect of the invention there is provided an ornament mover comprising a housing, motor means associated with the housing, a pulley drum drivingly connected to the motor means, a cord attached at one end to the drum and at its other end to an ornament to be carried thereby, the cord being windable onto the drum by the motor means, switch means for guidingly receiving the cord and being movable between a first position in which the cord can be wound onto the drum and a second position in which the cord is moved axially relative to the rotational axis of the drum so that in such position it can become suddenly fully unwound therefrom, and control circuit means for determining when the switch means is to move from its first position to its second position, thereby to selectively provide winding and sudden unwinding of the cord and consequent corresponding movement of an ornament attached thereto.

Preferably, the control means includes an electronic circuit coupled to a motion detector, such as a photo-diode, which operates as a motion detector such that on a change of light level being received by the photo detector the control means may switch on or switch off the motor means to thereby selectively provide for winding or unwinding of the cord and thus the ornament carried thereby onto or off the drum.

With the arrangement of the third aspect of the present invention it is therefore possible to provide an ornament mover wherein, for example, the ornament is a realistic-looking toy insect such as a spider which is thus able to drop down via its attachment to the cord when the latter is unwound from the winding drum in response to movement of the switch means from its first position in which it permits the winding of the cord onto the drum and its second position in which it permits the cord to suddenly unwind itself completely. Hence in this third aspect of the present invention the apparatus can mimic the movement of a real spider or similar kind of insect upon which there is attached a thread of web-like material and upon the approach of a person the "spider" suddenly drops down in front and immediately appears to climb back up its "thread" to the ceiling.

BRIEF DESCRIPTION OF THE DRAWINGS

Embodiments of the invention will now be described by way of example only with reference to the accompanying drawings in which.

DETAILED DESCRIPTION OF THE DRAWINGS

Figure 1:
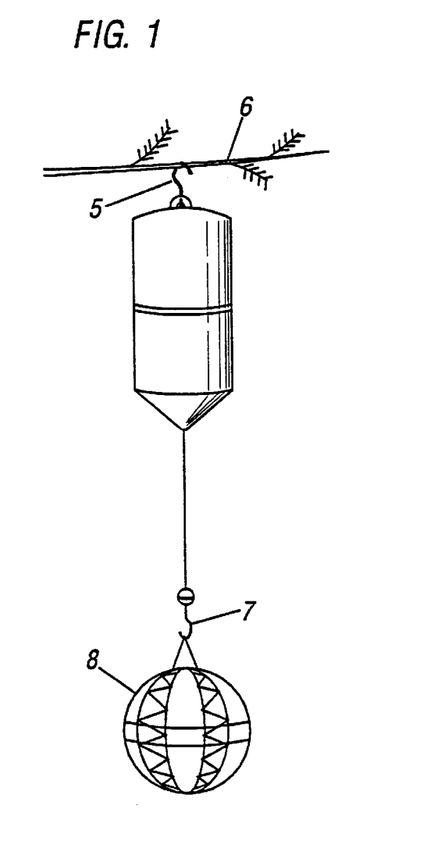
FIG. 1 is a perspective view of ornament moving apparatus utilizing the motor of the first embodiment of the invention.
Figure 2:
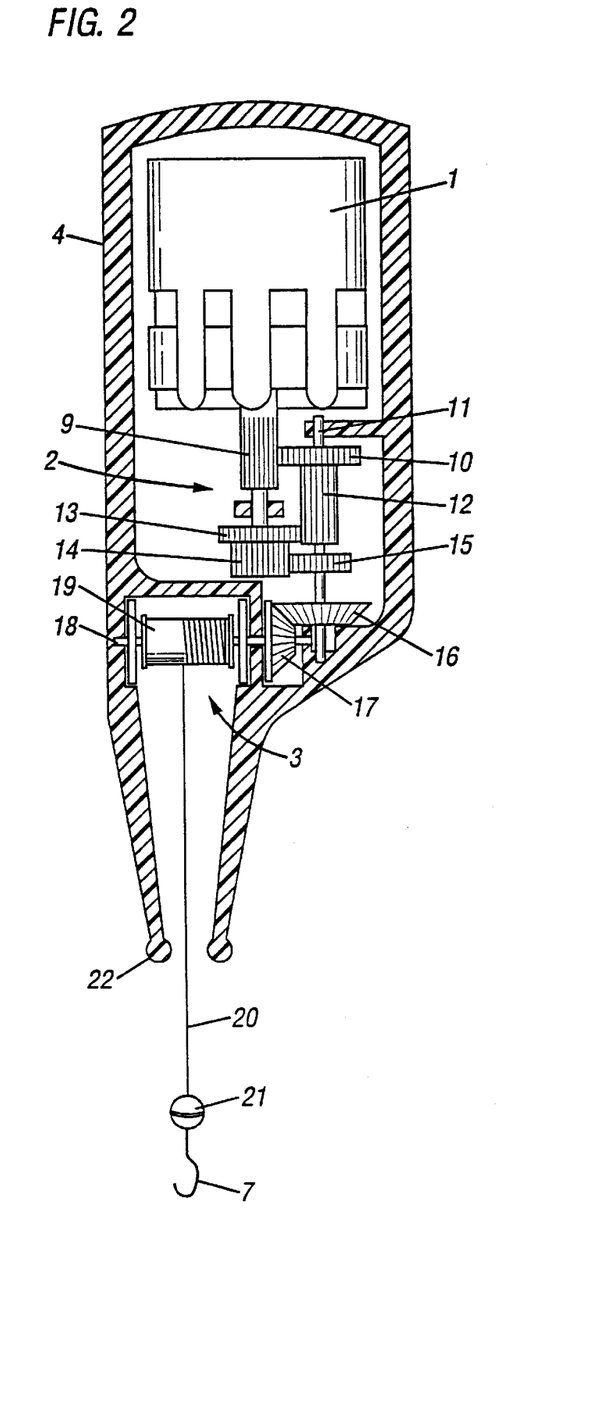
FIG. 2 is a cross-sectional view through the motor and transmission housing of the embodiment of FIG. 1.

With reference to the drawings, an embodiment of an electric motor Christmas tree ornament moving apparatus is shown generally in FIG. 1 and in more detail in FIG. 2. It comprises a motor 1, gear transmission shown generally at 2 and pulley mechanism shown generally at 3 contained within a general tubular plastic housing 4. The housing 4 is provided with a first hook 5 at one end for connection to a branch 6 of a Christmas tree or other hanging support, for example a curtain rail. The pulley mechanism 3 is provided at its distal end with a further hook 7 to which an ornament 8, for example a Christmas tree ornament, is hung.

With specific reference to FIG. 2, motor 1 is connected by power lines (not shown) to a mains supply of alternating current which, for example, may be by means of a plug which connects directly into the socket of a Christmas tree light set, by replacement of one "fairy" light bulb. The motor 1 is a synchronous motor driven at a frequency related to the line frequency of the input alternating current (50/60 hz, generally). The output from the motor 1 is provided by a toothed output shaft 9 which meshes with a first spur gear 10 mounted for rotation upon a spindle 11 secured to part of the housing 4. Spur gear 10 is itself attached to a toothed shaft 12 which meshes with a second spur gear 13 to which is also attached a toothed shaft 14. A third spur gear 15 completes the speed reduction gear train. Third spur gear 15 is itself drivingly connected to a bevel gear 16 which in turn meshes with a corresponding bevel gear 17 mounted for rotation on a shaft 18 upon which a pulley drum 19 is also mounted. A cord 20 is connected at one end to the pulley drum 19 and at its other end to a spherical stop member 21 to which hook 7 is attached.

Housing 4 encloses the motor 1, transmission 2, and pulley mechanism 3 and has a circular opening 22 through which cord 20 protrudes. The diameter of opening 22 is less than that of stop member 21.

In use, when mains power is applied to synchronous motor 1, this will cause the motor to rotate in one rotational direction or the other. This will in turn cause pulley drum 19 to rotate thus paying out or drawing in cord 20. If cord 20 is drawn in to a retracted position, the motor will continue to rotate until stop member 21 abuts against opening 22. At this point, synchronous motor 1 will stall and, due to the property of the synchronous motor which allows omnidirectional rotation, the motor will then change direction to that offering less resistance to motion, thus paying out cord 20 to an extended position. Once payed out to its fullest extent, the cord 20 will then start re-winding onto drum 19 to thus wind cord 20 in to the retracted position and so on, thus causing ornament 8 to move up and down continuously.

It will be appreciated by one skilled in the art that a synchronous motor is capable of rotating in one direction or the other and generally will have no preferred direction of rotation, this being determined initially by the relative position of the stator and rotor and the resistance to motion in any particular direction. When stop member 21 abuts opening 22, the reaction forces between rotor and stator will cause rotation in the reverse direction since the motor can no longer rotate in its existing direction.

For a synchronous motor to work in the present application, it is essential for it to have sufficient power to raise and lower the ornament via the transmission 2. Preferably, the motor 1 should be as small as possible so that the size of the casing 4 is correspondingly small and unobtrusive to the eye.

An embodiment of a preferred motor according of the invention for use with the ornament mover as described will now be described, by way of example only, with reference to FIGS. 3–6.

Figure 3:
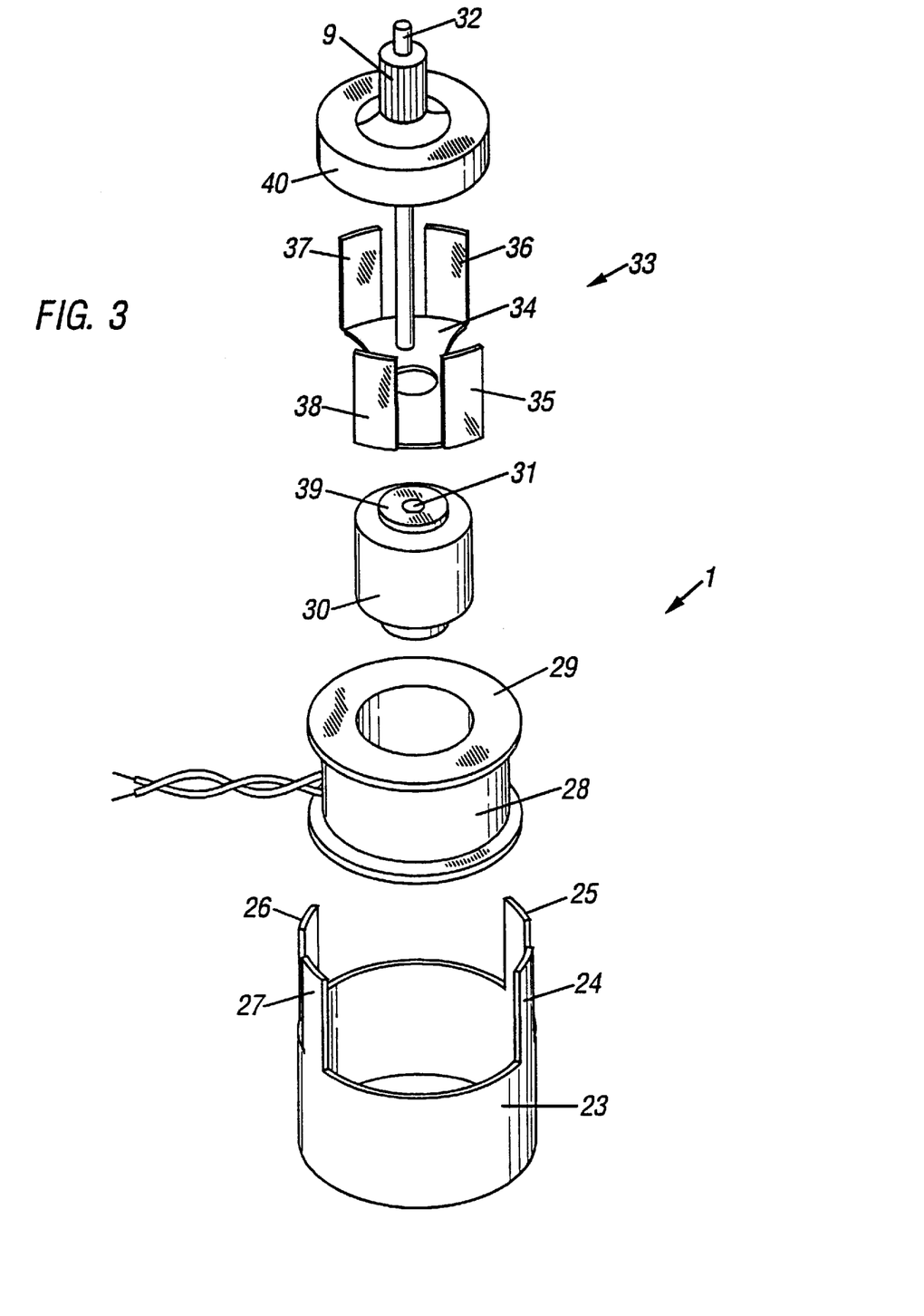
FIG. 3 is an exploded perspective view of a synchronous motor being the second embodiment of the invention.

An exploded view of the motor is shown in FIG. 3 and this comprises a cylindrical steel casing 23 closed at one end and having four axial projections 24, 25, 26 and 27 which form stator poles as described hereinafter. A coil 28 would on a hollow cylindrical bobbin 29 is normally disposed within casing 23 and receives a steel core 30. Core 30 is provided with a central cylindrical opening 31 which acts as a bearing surface for a shaft 32. A second stator 33 formed with a steel base 34 has four projections 35, 36, 37 and 38 is connected to end 39 of core 30. A magnet rotor 40 having gear 9 connected thereto is mounted for rotation on shaft 32.

Figure 4:
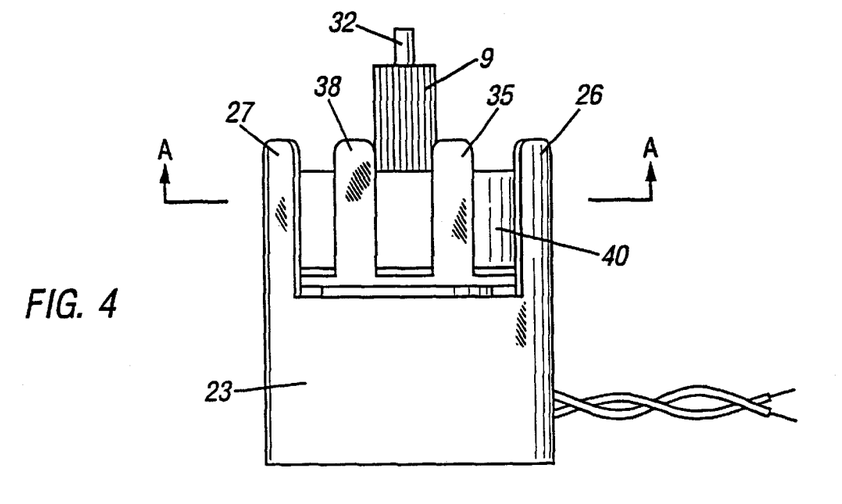
FIG. 4 is a side view of the assembled motor of FIG. 3.
Figure 5:
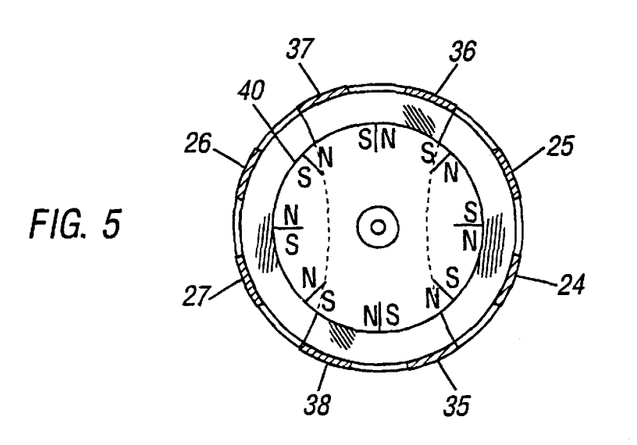
FIG. 5 is a cross-sectional view across A—A of FIG. 4.

When assembled, the coil 28 lies in the casing 23 with the core 30 being received in the bobbin 29. Second stator 33 is supported on core 30 so that projections 35–38 and projections 24–27 of casing 23 are co-radial relative to shaft 32, with rotor 40 being surrounded by the projections at its radial periphery, as shown in FIGS. 4 and 5.

Figure 6A:
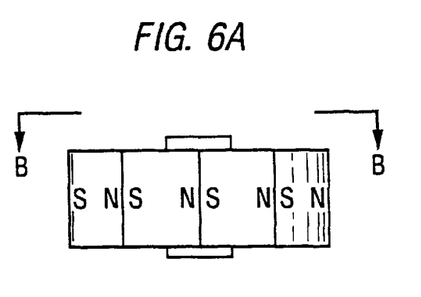
FIG. 6A is a side view of the magnet of the rotor of the embodiments of FIGS. 3–5.
Figure 6B:
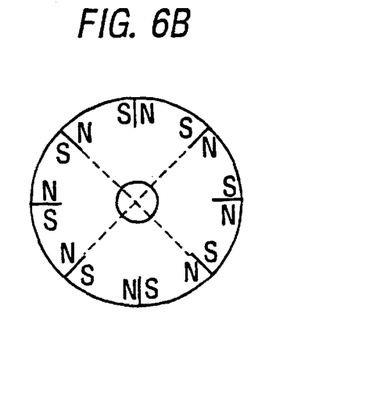
FIG. 6B being a view in the direction of arrow B of FIG. 6A.

The construction of the motor magnet 40 is shown in more detail in FIGS. 6A & 6B. The magnet comprises an eight pole ferrite magnet in the shape of a substantially solid cylindrical disc having only a small central hole for receiving shaft 32. The poles of the magnet 40 are aligned head to tail around the circumference with like poles being positioned diametrically opposite to each other.

The pole pieces 24–27 and 35–38 provide stator pulses poles which surround the magnetic rotor 40. The poles 24–27, connected to the casing 23, are excited by the winding with the opposite polarity to those pole pieces 35–38 of the second stator 33. The magnetic polarity and flux changes between the two sets of poles at the line frequency. Poles 36, 38 are formed wider than the other poles so as to set up an uneven flux concentration facilitating start up rotation when the motor is first powered on.

At a particular cycle of energizing current, the stator poles 35–37 will be at, for example, South polarity while the stator poles 24–27 will be at North polarity. The magnet will be forced to move and align itself so that its North poles align themselves with the stator poles 35–37 which are South and the South poles of the magnet align with stator poles 24–27 which are North. A half current cycle later, this reverses forcing the magnet to align itself with the opposite poles. The momentum of the rotating magnet at this point carries the motion on linearly in the same rotational direction so as to clear the poles just as the current direction changes, causing continuous motion in the manner of any normal synchronous motor.

A substantial advantage of the motor as described is that it utilises the largest possible magnet for a given motor diameter, since the magnet is practically the entire diameter of the motor, apart from the casing, and with the coil being positioned axially spaced apart from the rotor itself. Furthermore, by using a solid core a very efficient means of concentrating the inner core's magnetic flux is established.

Figure 7A:
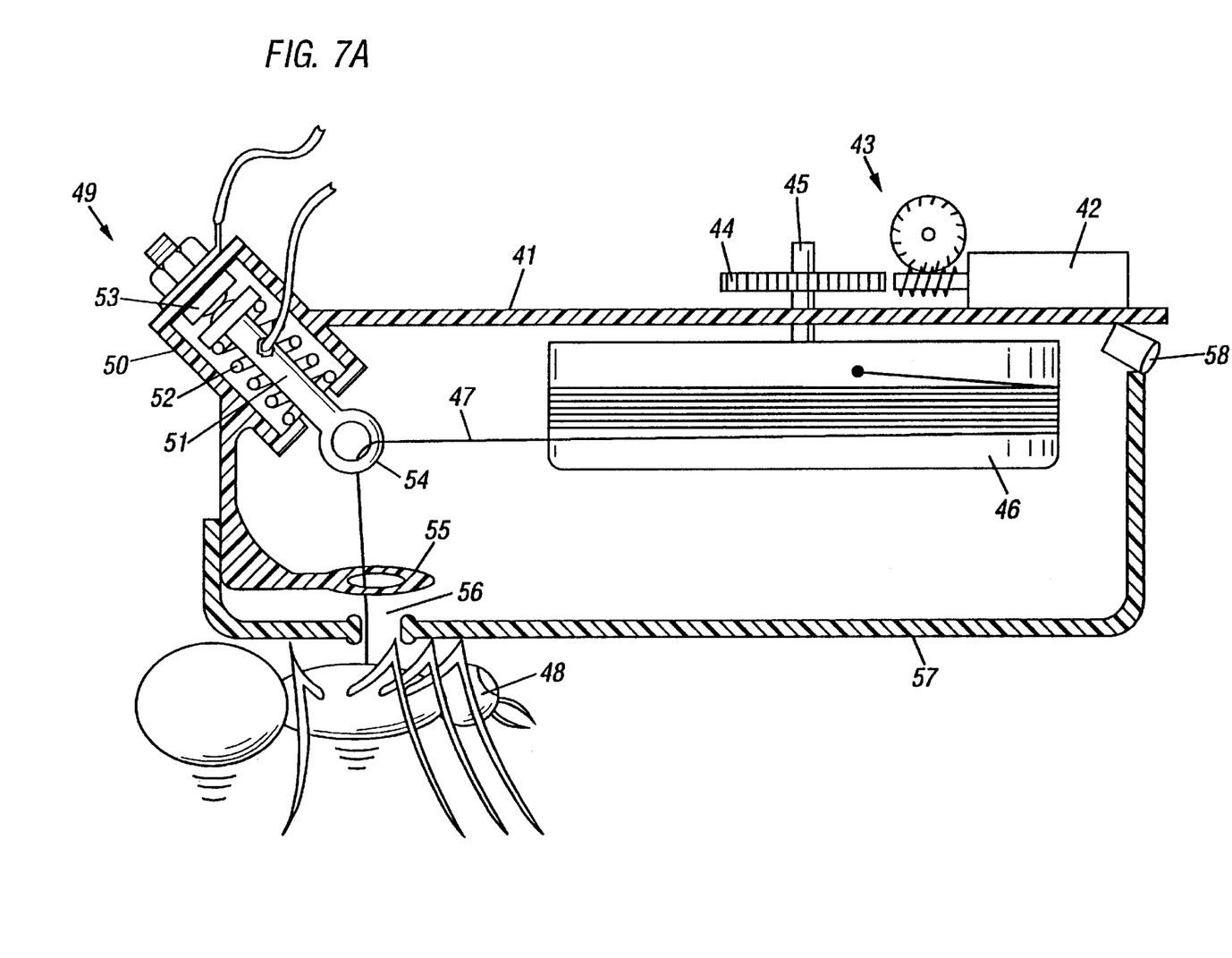
FIG. 7A is a sectional view of an ornament mover in accordance with the third aspect of the present invention showing the switch means in its first position.
Figure 7B:
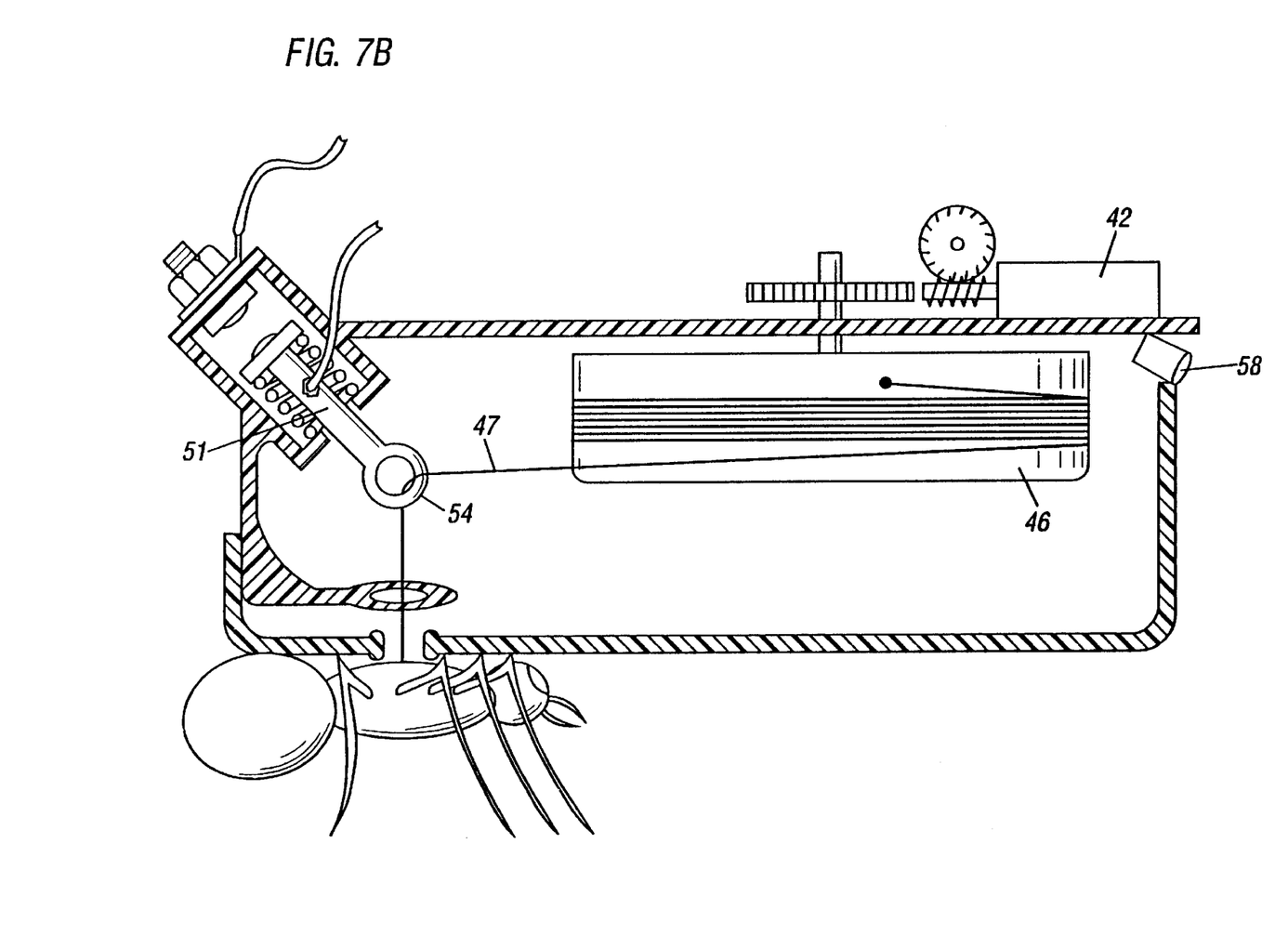
FIG. 7B is a view similar to that of FIG. 7A but showing the switch means in its second position and, FIG. 7C is a corresponding view showing the switch means having returned to its first position but with the cord having become unwound from the drum.
Figure 7C:
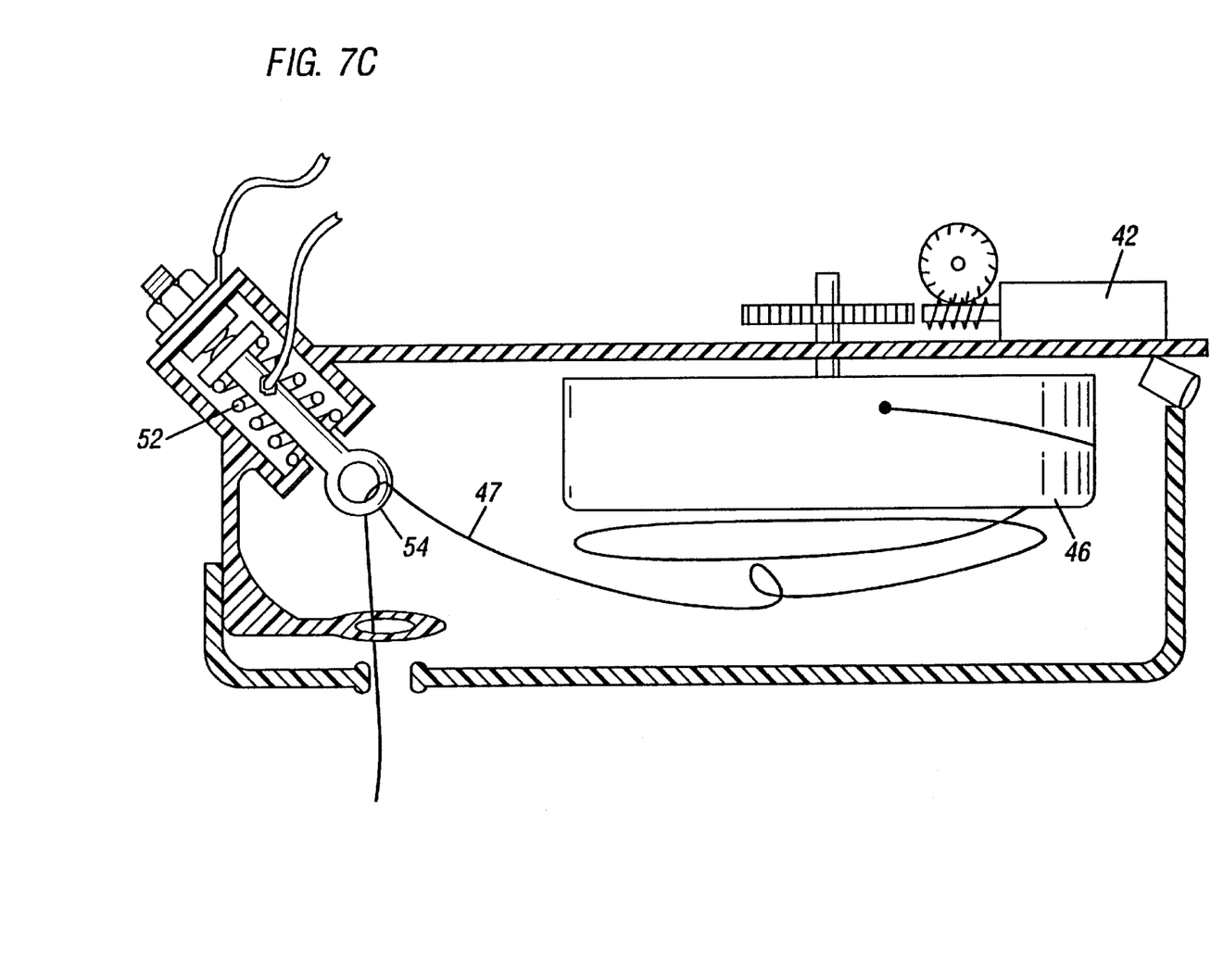
Figure 8:
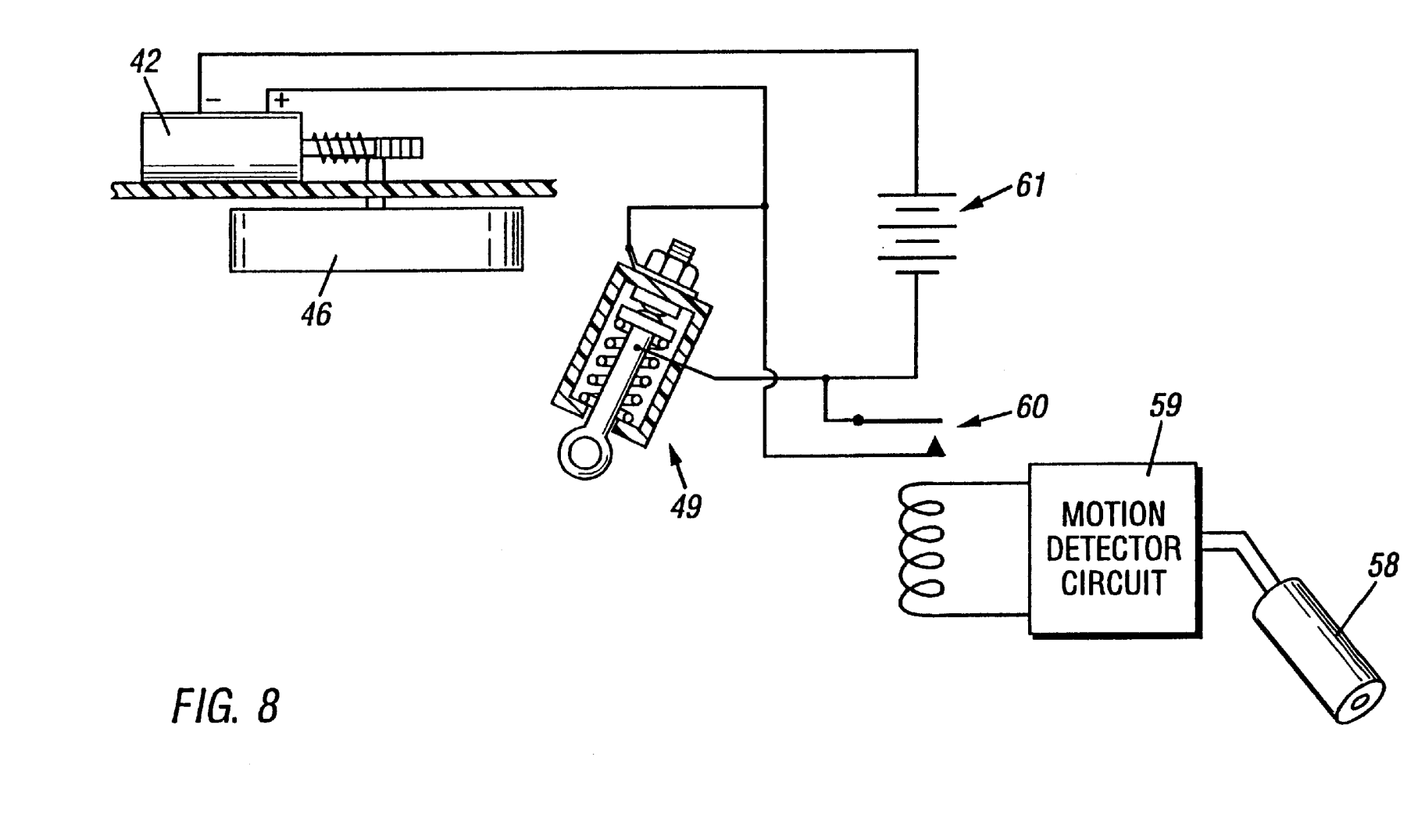
FIG. 8 is a simplified circuit diagram illustrating the control means necessary to operate the apparatus of FIGS. 7A–C.

Turning now to a third aspect of the present invention the arrangement shown in FIGS. 7A–7C and in FIG. 8 illustrate a simple but effective motor driven ornament mover which may be used in novelty items such as those mimicking the falling of a spider from a ceiling or, if preferred, the rising from a floor of other kinds of novelty ornaments, such as toy ghosts, which are required to rise a distance before suddenly falling back to ground level, apparently without any cause.

In FIGS. 7A–7C there is shown in cross-section an ornament mover in accordance with the invention which includes a rigid base plate 41 onto which is mounted a DC-driven motor 42 (or, if preferred, a synchronous motor of the present invention with a "no-back" device attached thereto), the motor output shaft again being connected to a speed-reduction and direction change gear box shown generally at 43 for driving a spur gear 44 mounted on a drive shaft 45 which extends through the base plate 41 and onto the lower end of which is mounted a cylindrical pulley drum 46. The pulley drum 46 is therefore rotatable horizontally about a vertical axis and, in the position shown, is adapted for clockwise rotation. Attached to the pulley drum 46 is a cord 47, on the other end of which is a plastics imitation spider 48 which can mimic the movement of a real spider in a manner to be described.

Switch means shown generally at 49 are fixed to the base plate 41 and comprises a hollow housing 50 within which is received an electrical contact shaft 41 biased by means of a spring 52 to press against another electrical contact 53. At the other end of contact shaft 51 there is a ring 54 through which is threaded the cord 47 and which is then guidingly received by a fixed second ring 55 positioned above a circular opening 56 in a cover 57 fixed to the base plate 41, in any conventional manner. Because the toy spider 48 is larger than the opening 56 then it acts as a stop member for the cord 47 in a manner analogous to the spherical stop member 21 shown in FIG. 2. A photo-diode 58 is mounted between the cover 57 and the base plate 41.

In the position shown in FIG. 7A the spider has reached its upward limit of travel but the switch control means 49 is still in its closed position.

In FIG. 7B it will be seen that although the spider 48 is in the same position as that shown in FIG. 7A nevertheless the pulley drum 46 has continued to wind the cord 47 onto it, thus pulling the ring 54 and hence the contact shaft 51 angularly downwards. At this point the switch means 49 becomes de-activated and, in a manner to be described with particular reference to FIG. 8, the motor 42 then stops. At this stage the ornament mover is "set" i.e. it is ready for use.

In FIG. 7C, there is shown the next stage of operation in which the motor 42 has been once again activated, the drum 46 has been rotated even further to the point where the ring 54 has been pulled further downwards until the last portion of the cord wound onto the drum 46 suddenly slips off the drum 46, the spider 48 falls, the ring 54 is returned via its spring 52 bias back to the position shown in FIG. 7A but, importantly, the whole of the cord 47 unwinds completely off the drum 46.

Turning now to FIG. 8 there is shown in schematic detail the circuit arrangement by which the steps described in FIG. 7A–C can occur. The photo-diode 58 is connected to conventional motion detector circuit 59 capable of operating a motor controller switch 60 which is normally open but which can be closed for a short period, such as 3 seconds, when the detector-diode 58 detects a change of light level. A conventional battery 61 is used to power the circuit in a manner which will now be described.

When the ornament mover is in its operating position, perhaps fixed to the ceiling or hanging by a string attachment from a door lintel etc., the switch control means 49 is initially in its closed position so that the motor 42 is powered by the battery 61 up to the point shown in FIG. 7B where the switch means 49 becomes electrically disconnected and the motor thereafter stops. In this position, provided the detector-diode 58 remains stable in terms of light input the ornament mover remains dormant. When a change in light level is detected as a result of, typically, a person walking underneath the detector-diode 58 the motion detector circuit 59 activates the switch 60 by closing it for a short period. When this happens the battery can then again power the motor 42 so that it continues to wind the cord 47 onto the drum until the situation shown in FIG. 7C has occurred i.e. the cord 47 slips off the drum and becomes completely unwound. When this happens the switch means 49 becomes closed so that the motor 42 continues to be powered by the battery 61 even though, shortly thereafter, the motion detector circuits 59 opens the switch 60.

The effect of this is that the spider appears to fall and then immediately starts to climb back up its "web", being the cord 47, until it reaches its dormant position and the ornament mover is ready for its next "victim".

In an alternative embodiment of the third aspect of the invention the reverse happens. Here, the idea is that the ornament mover is used to lift a novelty item such as a toy ghost once the photo-diode detects the presence of a person and as soon as it has risen to a predetermined height to let the ghost novelty item suddenly drop back to the floor. In this embodiment (not illustrated) the dormant phase is when the ghost novelty item is on the floor and once motion is detected it winds up, raising the ghost. When the ghost reaches its normal limit of travel upwards the cord opens the switch which then signals the motor control circuit but does not stop the motor, which then continues winding until the string completely unravels, suddenly. When this happens the switch will have gone back to its closed state and as it does so the motor control circuit stops the motor. During this phase the ghost is sitting on the floor in its dormant state.

The invention thus provides, in this third aspect, a very neat and simple way of improving movement effect of ornaments which can realistically mimic the desired effect of something dropping from a height and travelling back upwardly, or something slowly rising from the floor and then suddenly dropping.

It will be understood to those persons skilled in the art that the invention in its several aspects is illustrative of the simplicity and adaptability of the method by which it may be performed and is not intended to be limited thereby.

What is claimed is:

1. A synchronous motor comprising a coil; a rotor mounted co-axially with, but displaced axially relative to the coil, the rotor comprising a substantially solid, cylindrical magnet means; and stator means electrically associated with the coil and disposed about the radially periphery of said rotor for interacting electrically with the rotor to produce rotational movement, wherein the stator means comprises first and second stators, first stator being operatively associated with an axial end of the coil remote from the rotor and comprising at least one limb which extends axially toward and around the periphery of the rotor, the second stator being operatively associated with an axial end of the coil close to the rotor and comprising at least one limb which extends toward and around the periphery of the rotor.

2. A synchronous motor comprising a coil; a rotor mounted co-axially with, but displaced axially relative to the coil, the rotor comprising a substantially solid, cylindrical magnet means; and stator means electrically associated with the coil and disposed about the radial periphery of said rotor for interacting electrically with the rotor to produce rotational movement, wherein the stator means comprises first and second stators operatively associated with the opposed axial ends of the coil, the first stator comprising a casing of the motor, said casing being closed at an end remote from the rotor and containing the coil, and limbs which extend axially toward and around the periphery of the rotor, the second stator being disposed at the opposed end of the coil and interposed between the limbs of the first stator.

* * * * *